(12) United States Patent
Liang

(10) Patent No.: US 12,546,928 B1
(45) Date of Patent: Feb. 10, 2026

(54) QUICK CONNECTOR FOR OPTICAL FIBER SOURCE

(71) Applicant: Shenzhen Wana Technology Co., Ltd., Guangdong (CN)

(72) Inventor: Weijian Liang, Guangdong (CN)

(73) Assignee: Shenzhen Wana Technology Co., LTD, Shenzhen (CN)

( * ) Notice: Subject to any disclaimer, the term of this patent is extended or adjusted under 35 U.S.C. 154(b) by 0 days.

(21) Appl. No.: 18/946,728

(22) Filed: Nov. 13, 2024

(30) Foreign Application Priority Data

Jul. 17, 2024 (CN) .......................... 202421684707.4

(51) Int. Cl.
| | |
|---|---|
| *F21V 8/00* | (2006.01) |
| *F21V 17/00* | (2006.01) |
| *F21V 17/04* | (2006.01) |
| *F21V 19/00* | (2006.01) |

(52) U.S. Cl.
CPC .......... *G02B 6/0006* (2013.01); *F21V 17/002* (2013.01); *F21V 17/04* (2013.01); *F21V 19/0015* (2013.01)

(58) Field of Classification Search
CPC ........ F21V 23/06; F21V 17/002; F21V 17/04; F21V 17/10; F21V 17/12; F21V 17/164; F21V 17/162; F21V 19/0015; F21V 19/0025; F21V 19/001; F21V 19/002; F21V 19/003; F21V 19/0035; F21V 19/004; F21V 19/0055; G02B 23/2469
See application file for complete search history.

(56) References Cited

U.S. PATENT DOCUMENTS

| | | | | |
|---|---|---|---|---|
| 4,461,538 | A * | 7/1984 | Breed, III | G02B 6/4204 250/227.24 |
| 5,833,422 | A * | 11/1998 | Haga | F16B 21/20 411/521 |
| 2006/0044820 | A1* | 3/2006 | Ruffin | G02B 6/0006 362/267 |

FOREIGN PATENT DOCUMENTS

| | | | | |
|---|---|---|---|---|
| DE | 102014004328 A1 * | 4/2015 | | G02B 6/0006 |
| DE | 102019214762 A1 * | 4/2021 | | F21V 17/16 |
| WO | WO-2023073147 A1 * | 5/2023 | | B60Q 1/0064 |

* cited by examiner

*Primary Examiner* — Erin Kryukova
(74) *Attorney, Agent, or Firm* — Zhigang Ma

(57) ABSTRACT

The invention relates to the technical field of fiber source, and discloses a quick connector for optical fiber source, including a light source housing; an LED lamp bead inside the light source housing; a detachable connection between one end of the light source connector and one end of the light source housing; a jaw chuck plate installed inside the light source connector; a jaw on the jaw chuck plate, the jaw including annularly arrayed jaw pieces which are curved in the axial direction for clamping the optical fiber; an inner sleeve inside the light source connector, fixing the jaw on the jaw chuck plate; a release button plugged in the inner sleeve, which can spread the jaw by being pressed with external force to take out the optical fiber. The invention can realize the rapid insertion and removal of the optical fiber. The operation is simple, without other assistant tools.

4 Claims, 4 Drawing Sheets

QUICK CONNECTOR FOR OPTICAL FIBER SOURCE

TECHNICAL FIELD

The invention relates to the optical fiber source technology, in particular to the quick connector for optical fiber source.

BACKGROUND OF THE PRESENT INVENTION

The optical fiber source includes a light source and optical fibers. It utilizes the light emitted by the light source and employs optical fibers to conduct the light, such as the application on luminous clothing. Optical fibers are wrapped around the clothing to perform in a dark environment. It's also used on landscape decoration. Optical fibers are wrapped around objects to achieve a glowing visual effect.

However, the existing optical fiber on the market is usually locked and fixed by screws at the connection position with the light source, resulting in the need for additional tools to assist in the process of use, and there is inconvenience in disassembly or installation.

Therefore, it is necessary to improve it.

SUMMARY OF PRESENT INVENTION

The technical problem solved by the invention is to provide the quick connector for optical fiber source, aiming at the defects existing in the prior art, so as to solve the problems raised in the background technology.

To solve the above technical problem, the technical solution adopted by the present invention is as follows: the quick connector for optical fiber source. It includes: a light source housing, the light source housing is a hollow structure; an LED bead, the LED bead is installed inside the light source housing; a light source connector, the light source connector is a hollow structure, one end of the light source connector being detachably connected to one end of the light source housing; a jaw chuck plate, the jaw chuck plate is a hollow structure and is installed inside the light source connector; a jaw, the jaw is installed on the jaw chuck plate, the jaw including an array of jaw pieces arranged in a ring shape, the jaw pieces being bent along the axial direction, the jaw being used to grip the optical fiber; an inner sleeve, the inner sleeve is a hollow structure and plugged inside the light source connector, the inner sleeve fixing the jaw on the jaw chuck plate; a release button, the release button is a hollow structure, the release button being blocked inside the inner sleeve, the release button spreading the jaw by an external force to release the optical fiber.

Furthermore, including a buffer pad, the buffer pad is set between the light source connector and the jaw chuck plate.

Furthermore, including a waterproof ring, the waterproof ring is fitted over the outer circumference of the light source connector.

Furthermore, the light source housing is connected with the light source connector by a screw thread.

Compared with the prior art, the beneficial effects of the invention are as follows: through combination of the jaw and the release button, when the optical fiber is inserted into the jaw for fixing, the optical fiber can't be pulled out due to the restriction of jaw pieces on the jaw. The optical fiber can be removed by pressing the release button to open the jaw and release the restriction on the optical fiber. It has the advantage of convenient installation and removal without external tools, making the operation more convenient.

DETAILED DESCRIPTION OF THE EMBODIMENT'S

A further detailed description of the invention based on the attached drawings are as followings.

The embodiments described in reference to the attached drawings are exemplary and intended to be used to interpret the application, rather than being understood as limitations on this application. In the description of this application, what need to be understood are the terms "center", "longitudinal", "lateral", "length", "width", "thickness", "up", "down", "front", "back", "left", "right", "vertical", "horizontal", "top", "bottom", "inner", "outer", "clockwise", "counterclockwise", and other terms indicating orientations or positional relationships are based on the orientations or positional relationships shown in the attached drawings, solely for the purpose of facilitating the description of the present application and simplifying it, and are not intended to indicate or imply that the device or element referred to must have a specific orientation, be constructed and operated in a specific orientation, and therefore cannot be understood as limitations on the present application. In addition, the terms "first" and "second" are used only to describe purposes and can't be understood as indicative or implied relative importance or implied number of the technical characteristics indicated. Thus, features defined with "first" and "second" may explicitly or implicitly include one or more of these features. In the description of this application, "several", "many" mean two or more, unless otherwise explicitly and specifically qualified. In the present application, unless otherwise expressly specified and limited, "install", "connect", "link", "fix", and other similar terms should be understood broadly, for example, it may be fixed connection, detachable connection, or integral connection; It may be mechanical or electrical connection; It may be direct connection or indirect connection through an intermediate medium, or it can be a internal communication between two components. For ordinary technical personnel in the field, the specific meaning of the above terms in this application can be understood in light of specific circumstances. In this application, unless otherwise explicitly specified and limited, that the first feature is "above" or "below" the second feature may include cases where the first and second features are in direct contact or are not in direct contact but are in contact through other features between them. Moreover, That the first feature is "above", "over", and "on the top of" the second feature includes the first feature directly above and obliquely above the second feature, or simply indicates that the first feature is horizontally higher than the second feature. That the first feature is "below", "underneath", and "under" the second feature includes the first feature directly above and obliquely above the second feature, or simply indicates that the horizontal height of the first feature is less than that of the second feature.

Figure 1:
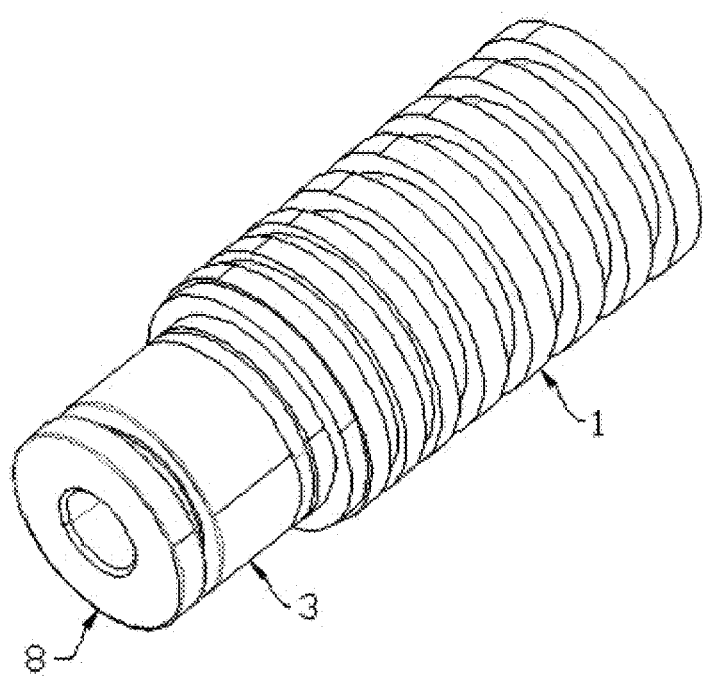
FIG. 1 is a structural schematic diagram of the invention.
Figure 2:
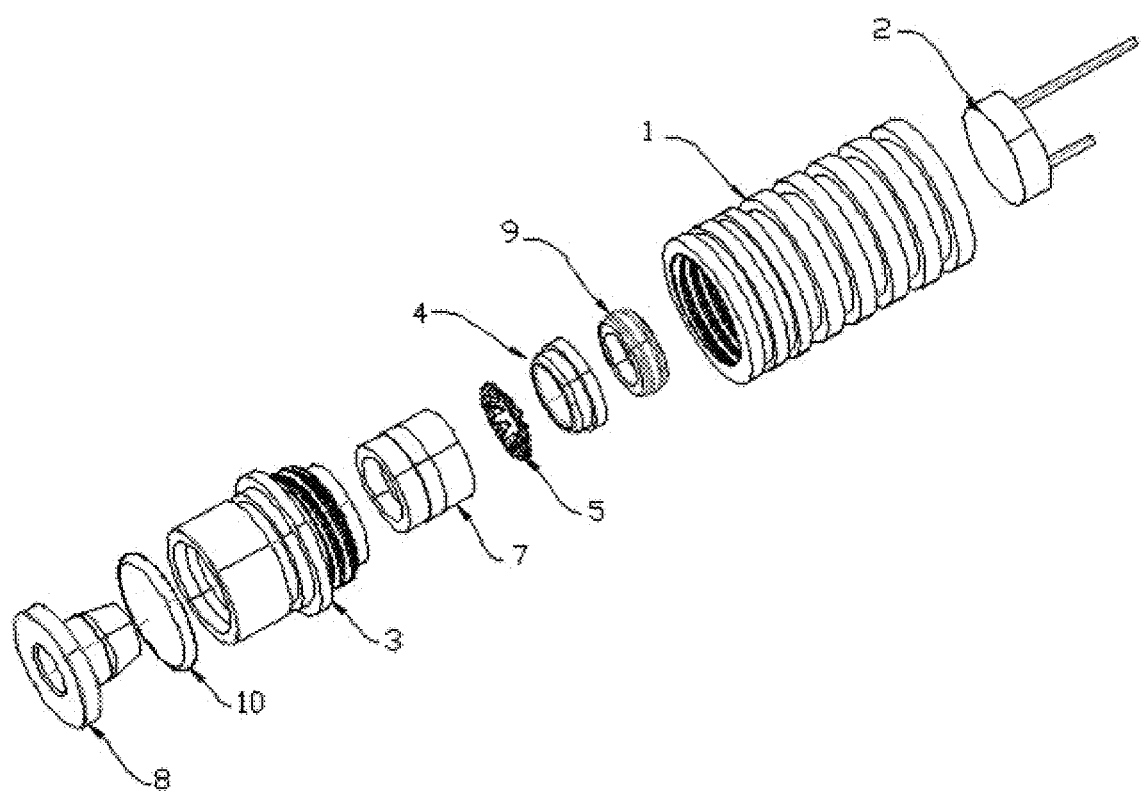
FIG. 2 is a schematic diagram of the explosion structure of the invention.
Figure 3:
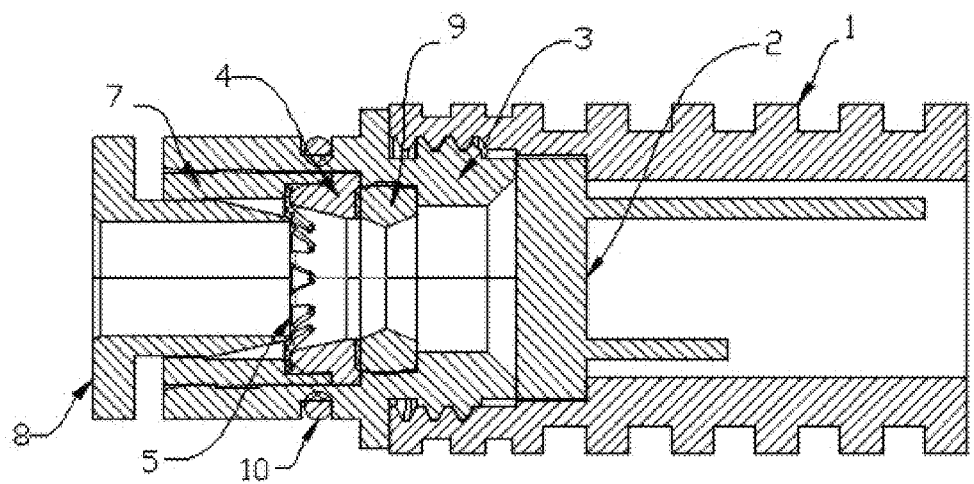
FIG. 3 is a schematic diagram of the section view structure of the invention.
Figure 4:
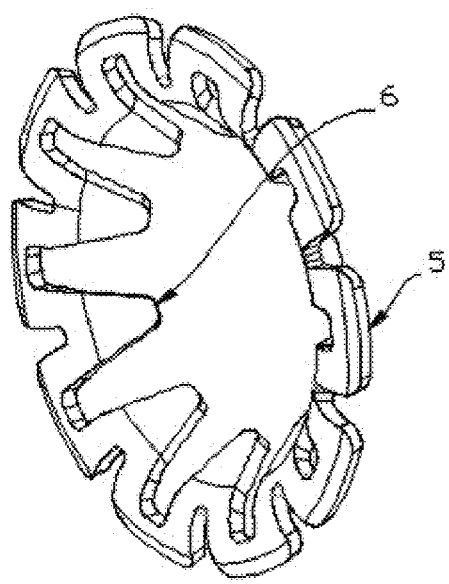
FIG. 4 is a structural schematic diagram of the jaw.
Figure marks: 1. light source housing; 2. LED lamp bead; 3. light source connector; 4. jaw chuck plate; 5. jaw; 6. jaw pieces; 7. inner sleeve; 8. release button; 9. buffer pad; 10. waterproof ring.

As shown in FIGS. 1-4, the quick connector is provided for optical fiber source, including: a light source housing 1, it is a hollow structure; an LED lamp bead 2, it is set inside the source housing 1; a connector of the light source 3, it is a hollow structure, and one end of the light source connector 3 is detachably connected with one end of the light source housing 1; a jaw chuck plate 4, it is the hollow structure, and it is installed inside the light source connector 3; a jaw 5, it is installed on the jaw 5 chuck plate 4, the jaw 5 including the ring array distribution of jaw pieces 6 which bends in the axial direction, the jaw 5 being used to tighten the jaw pieces; an inner sleeve 7, it is a hollow structure, and it is set inside the light source connector 3, the inner sleeve 7 fixing the jaw 5 on the jaw chuck plate 4; a release button 8, it is a hollow structure in the inner sleeve 7, and the release button spreads jaw 5 through external pressure to remove the fiber.

In view of the technical problems existing in the background technology, a kind of quick connector for optical fiber source is proposed, which is mainly aimed at solving the technical problems of optical fiber installation and disassembly. In this regard, the above technical scheme is proposed. In the implementation, the jaw chuck plate 4, the jaw 5, the inner sleeve 7 and the release button 8 of part of the structure are set in the light source connector 3. In order to facilitate fiber insertion, the light source housing 1, the light source connector 3, the jaw chuck plate 4, the inner sleeve 7, and the release button 8 are prepared as hollow structures. When installing the optical fiber, the fiber can pass the release button 8, the jaw 5, the jaw chuck plate 4, reaching at the position of LED lamp bead 2. The LED lamp bead 2 can be rgb-LED lamp bead 2, and the jaw 5 can be prepared by materials with elastic effect, such as metal or plastic. When the optical fiber passes through the jaw 5, the fiber can open the jaw pieces annually arranged on jaw 5. Jaw pieces 6 exert a force on the fiber due to elasticity, causing the fiber can't be pulled out in the process of backward movement because of the force of the jaw 5 on the fiber, and the fixation on the light is achieved. When disassembly is required, the release button 8 is pressed under the manual operation from the outside. The release button 8 is T-typed. The release button 8 put in the light source connector 3 opens the jaw 5 and removes the fixation from the jaw 5 on the fiber, so as to remove the fiber and complete the disassembly process.

The adoption of the above technical scheme offers the advantages of convenient installation and disassembly, and it is easier to operate without the help of external tools.

Further, a buffer pad 9 is included, and the buffer pad 9 is disposed between the light source connector 3 and the jaw chuck plate 4. The provided buffer pad 9 is used to cushion and support the jaw chuck plate 4.

Further, a waterproof ring is included, and the waterproof ring is sleeved on the peripheral surface of the light source connector 3. In order to achieve the waterproof function, the waterproof ring is arranged on the light source connector 3, achieving the waterproof effect when connected with the light source housing.

Preferably, a threaded connection is adopted between the light source housing 1 and the light source connector 3.

The above does not constitute any limitation on the technical scope of the invention. Any modifications, equivalent changes, and decorations made to the above embodiments based on the essence of the invention still fall within the scope of the technical solutions of the invention.

The invention claimed is:

1. A quick connector for an optical fiber source, characterized by the following features:
    a light source housing, the light source housing being a hollow structure;
    an LED bead, the LED bead being installed inside the light source housing;
    a light source connector, the light source connector being a hollow structure, one end of the light source connector being detachably connected to one end of the light source housing;
    a jaw chuck plate, the jaw chuck plate being a hollow structure and being installed inside the light source connector;
    a jaw, the jaw being installed on the jaw chuck plate, the jaw including an array of jaw pieces arranged in a ring shape, the jaw pieces being bent along the axial direction, the jaw being used to grip the optical fiber;
    an inner sleeve, the inner sleeve being a hollow structure, the inner sleeve being plugged inside the light source connector, the inner sleeve fixing the jaw on the jaw chuck plate;
    a release button, the release button being a hollow structure, the release button being blocked inside the inner sleeve, the release button spreading the jaw by an external force to release the optical fiber.

2. The quick connector for optical fiber source according to claim 1, wherein the quick connector further includes a buffer pad that is arranged between the light source connector and the jaw chuck plate.

3. The quick connector for optical fiber source according to claim 1, wherein the quick connector further includes a waterproof ring that is fitted over the outer circumference of the light source connector.

4. The quick connector for optical fiber source according to claim 1, wherein the light source housing is connected with the light source connector by a screw thread.

\* \* \* \* \*